Patented May 2, 1950

2,506,339

UNITED STATES PATENT OFFICE 2,506,339

METHOD OF PREPARING AN ADHESIVE BY MIXING A RUBBER LATEX, FILLER, AND A BITUMINOUS EMULSION

Walter D. Buckley, Berkeley, Paul E. McCoy, San Francisco, and Lyndon G. Thompson, Oakland, Calif., assignors, by mesne assignments, to Stancal Asphalt & Bitumuls Company, San Francisco, Calif., a corporation of Delaware No Drawing. Application May 10, 1946,
Serial No. 668,768

14 Claims. (Cl. 260—28.5)

This invention relates to adhesive compositions and to a method of preparing the same.

The invention relates more particularly to adhesives which are of such consistency and contain such ingredients that they can be used directly in pasting machines in the manufacture of paper board and the like; the adhesive being used to join and hold together the plies of paper.

In the art of adhesives, especially as practiced in the paper board industry, it has long been the custom to prepare glues from starch or sodium silicate. These glues have little resistance to water. More recently it has become a common practice to prepare adhesives from a synthetic resin, such as urea-formaldehyde, and starch. These synthetic resin-starch adhesives have improved resistance to water, but they are expensive and require manufacture in small batches just before use; the finished adhesive sets if it is stored for any considerable length of time.

It is an object of the present invention to provide adhesive compositions which contain all the necessary ingredients for a finished adhesive, and which can be stored for considerable periods of time, and shipped, prior to use.

It is a further and particular object of the invention to provide a means of obtaining such adhesives, economically and of high quality.

These and other objects will be apparent from the ensuing description and the appended claims.

In practicing the method and producing the product of the invention, a rubber latex (natural or synthetic) is treated with a stabilizer in sufficient amount to stabilize the latex against breakdown by admixture of finely divided mineral matter; the stabilized latex is mixed with a finely divided or colloidal mineral filler; and the stabilized latex-mineral filler mixture is then mixed with an oil-in-water type bituminous emulsion.

The product so made has adhesive properties and is characterized by quick set when applied as a film between two plies of paper and pressure applied. Paper board and the like glued or pasted with this product exhibit high resistance to wet and dry delamination.

The method of making the product is facile and avoids major difficulties which are entailed by admixture of some of the ingredients. Thus, if the mineral filler is mixed first with the bituminous emulsion, a highly viscous product results which is difficult to handle. By stabilizing the latex, breakdown of the same by admixture with mineral filler is avoided, and by mixing mineral filler with the stabilized latex, then mixing with bituminous emulsion, at no stage is a difficultly workable intermediate product obtained.

As stated, natural or synthetic rubber latex may be employed. Any variety of natural rubber latex may be used. Among synthetic rubber latices, those of butadiene-styrene polymers are preferred; and they are preferred to the natural rubber latices. Other suitable synthetic rubber latices include Thiokol, neoprene and Perbunan latices. Thiokol is an ethylene dichloride-alkali polysulfide condensation product. Neoprene is a polymer of a chloro butadiene. Perbunan is a butadiene-acrylonitrile polymer.

These latices will normally contain 30 to 60% solids, but latices of lower or higher solids content may be used. Preferably, high solids latices, about 35–45% solids, are used.

Natural and synthetic rubber latices, as obtained in commerce, normally contain a stabilizer, such as ammonia or a soap-type stabilizer, but normally not in sufficient amount to resist breakdown on admixture of the latex with finely divided mineral matter. Suitable stabilizers added in accordance with the invention are the sodium and potassium soaps of Vinsol resin, polyvinyl alcohol, blood (water miscible dry blood, or liquid, homogenized coagulated blood such as described in Buckley and Bly, U. S. Patent 2,372,658), casein, soya bean meal, etc. Vinsol resin and polyvinyl alcohol are, however, preferred. These stabilizers will be used in amount sufficient to prevent breakdown of the latex on admixture of finely divided mineral matter.

Vinsol resin is a solvent extracted, petroleum hydrocarbon-insoluble pinewood resin described in greater detail in Buckley, U. S. Patent No. 2,256,886.

Examples of suitable finely divided mineral fillers are bentonite clay, other forms of clay, diatomaceous earth, talc, and argillaceous materials in general. Such materials should be finely divided, capable of being dispersed in water and having the property of increasing substantially the viscosity of the latex-bituminous emulsion mixture. Bentonite and other forms of clay are preferred, bentonite being the most advantageous.

Bituminous emulsions of any kind may be used; e. g., oil-in-water emulsions of asphalt (natural, or residua from distillation of petroleum; high, low or medium penetration, steam refined or air blown), coal tar, coal tar pitch, etc. Preferably, emulsions of petroleum asphalt, solid or semi-solid at normal atmospheric temperature, are used as the disperse phase. These bituminous materials may be emulsified by various means;

e. g., by soaps (Vinsol resin soap, rosin oil soap, etc.), proteins, etc. Emulsions capable of mixing with fine mineral aggregates without breakdown (ASTM slow-setting or mixing grade emulsions), emulsions which break quickly on contact with aggregates (ASTM quick-setting or penetration grade emulsions) and emulsions of intermediate stability (ASTM medium-setting emulsions) may be used; and these may be prepared by any of various means well known in the art.

Preferably, however, asphalt emulsions of high asphaltic content (50% or above, most advantageously 60 or above) are used; and although mixing grade asphalt emulsions of 50 to 70% residue yield good products and are easily used, it is preferred to use a quick-setting or penetration grade emulsion of 60% residue or higher. These penetration emulsions are contaminated by less non-asphaltic constituents and are more economical than the mixing emulsion, and although they would normally undergo breakdown on admixture with finely divided mineral matter, since the latter will have previously been mixed with stabilized latex, the penetration emulsion is protected against breakdown.

Most advantageously, the penetration emulsions are made in accordance with Montgomerie, U. S. Patent No. 1,643,675 (adding hot asphalt to hot, dilute aqueous caustic alkali, with agitation) or Braun, U. S. Patent No. 1,737,491 (adding hot asphalt and hot alkaline water to a seed batch of preformed emulsion). Or, if an asphalt is used which is not emulsifiable in hot, aqueous alkali without the addition of an added emulsifier, an emulsifier such as oleic acid or Swedish rosin oil (or alkali metal soaps of the same) may be added to the alkaline water. Or the asphalt may be modified in accordance with Fratis and Oakley, application for United States Patent, Serial No. 404,196, filed July 26, 1941, now U. S. Patent 2,406,823, to render it emulsifiable in hot, dilute aqueous caustic alkali solution.

The proportions of the various ingredients may be as follows (parts by weight, based on 100 parts by weight of finished product). Latex solids, 1 to 20, preferably 4 to 6; latex stabilizer, 0.5 to 5, preferably 1 to 3; mineral filler, 1 to 10, preferably 3 to 6; bitumen, 20 to 50, preferably 40 to 50. The finished product will contain water to bring the total formula to 100 parts by weight. Most or all of this water will be present in the starting materials (latex and emulsion). Some water may be added to the finished product, as, for example, to meet viscosity requirements of a particular user. In any event, however, the total water content should be kept below an upper limit dictated by the desirability of a product having sufficient viscosity to serve as an adhesive (too thin a product will not adhere well to paper) and the desirability of a product containing a high proportion of solids (the water evaporates after the adhesive is applied, hence too dilute a product will not leave as much deposit of active material on the surfaces pasted).

Details of procedure are subject to variation. Preferably, where Vinsol resin or other saponifiable latex stabilizer is used, the following procedure is employed. The stabilizer is saponified in hot, fairly concentrated, e. g., 25%, aqueous caustic soda or caustic potash solution; the latex, either hot or cold, is added to the soap solution and mixed therewith; the mineral filler is added to the stabilized latex and stirred therewith, preferably in the cold; and the stabilized latex-mineral filler mixture is added to and mixed with the bituminous emulsion, either in the hot or cold.

Where polyvinyl alcohol is used as the latex stabilizer, it is preferred to heat the polyvinyl alcohol with water, in proportions of about 1 part by weight of the former and 3 of the latter, for about 1 hour; add the resulting solution or dispersion to the latex; add the mineral filler to the stabilized latex; together with sufficient water to avoid unduly high viscosity (i. e., to permit stirring and pumping of the mixture); and add the stabilized latex-mineral filler mixture to the bituminous emulsion.

The following specific examples will serve further to illustrate the practice and advantages of the invention:

Example 1.—1.5 parts by weight of Vinsol resin were mixed and heated with a solution of 0.25 part by weight of caustic soda in 3.75 parts by weight of water until the Vinsol resin dissolved. 15.8 parts by weight of a 38% solids latex (GRS-X-231), being the U. S. Government designation of a 1:3 butadiene-styrene polymer in latex form) were added to and stirred with the above described caustic solution of Vinsol resin. To the thus stabilized latex were added 3.7 parts by weight of dry, powdered bentonite clay, which was thoroughly stirred into the latex; this operation being carried out in the cold. Finally, the latex-bentonite mixture was added to and intimately stirred with 75 parts by weight of a 60% residue, quick-setting emulsion of 50/60 penetration, California steam refined asphalt. This asphalt emulsion was prepared by the method of Braun, U. S. Patent No. 1,737,491, 60 parts of hot asphalt and 40 parts of 0.32% aqueous caustic soda solution being added simultaneously to a body of hot, vigorously agitated seed batch of similar emulsion.

Example 2.—2.5 parts by weight of polyvinyl alcohol (Du Pont, medium viscosity, grade RH-488), 10 parts by weight of water were mixed together and held at 180° F. for ½ hour, after which 40 parts by weight of water were mixed in. Then 10.5 parts by weight of the same latex as in Example 1 were added to the polyvinyl alcohol-water dispersion, after which 6 parts by weight of bentonite and 31 parts by weight of a 61% residue asphalt emulsion (otherwise the same as emulsion of Example 1) were added as in Example 1.

These adhesives produce glue lines, when applied between plies of paper in the usual way, characterized by excellent wet and dry delamination. The adhesives can be stored for considerable lengths of time and shipped to the point of use, there to be used without further treatment and without significant deterioration. The adhesive of Example 1 had a viscosity (SSF/122° F.) of about 150 seconds. The adhesive of Example 2, purposely made to be a thick product adapted for requirements of a thick product capable of use on pasting machines operating on extra wide paper, had a viscosity too high to be measured at 122° F. by the SSF method. It had the consistency of a soft paste, and could be used as such or thinned with water.

We claim:

1. In the process of preparing an adhesive composition by intimately admixing a rubber latex, mineral filler to increase substantially the viscosity of said composition, and a bituminous emulsion, the improvement which comprises first mixing about 1 to 10 parts of the mineral filler in about 1 to 10 parts, based on the solids content, of a rubber latex containing about 0.5 to 5 parts of a stabilizing agent for the rubber latex to prevent breakdown of the rubber latex upon contact with the mineral filler, and then mixing the resulting rubber latex-mineral filler mixture with about 20 to 50 parts, based on the solids content, of an oil-in-water bituminous emulsion, sufficient water being present to effect a total of 100 parts of composition, the parts being by weight.

2. The improvement substantially as described in claim 1, wherein the bituminous emulsion is an asphalt emulsion.

3. The improvement substantially as described in claim 2, wherein the asphalt emulsion is a quick-breaking asphalt emulsion meeting ASTM demulsibility specifications for said emulsion.

4. The improvement substantially as described in claim 1, wherein the mineral filler is an argillaceous material.

5. The improvement substantially as described in claim 4, wherein the mineral filler is bentonite clay.

6. The improvement substantially as described in claim 1, wherein the stabilizer for the rubber latex is polyvinyl alcohol.

7. In the process of preparing an adhesive composition by intimately admixing a rubber latex, mineral filler to increase substantially the viscosity of said composition, and a bituminous emulsion, the improvement which comprises first mixing about 1 to 10 parts of finely divided argillaceous material in about 1 to 10 parts, based on the solids content, of a rubber latex containing about 0.5 to 5 parts of a stabilizing agent for the rubber latex to prevent breakdown of the rubber latex upon contact with said argillaceous material, and then mixing the resulting rubber latex-argillaceous material mixture with about 20 to 50 parts, based on the solids content, of an oil-in-water asphalt emulsion, sufficient water being present to effect a total of 100 parts of composition, the parts being by weight.

8. The improvement substantially as described in claim 7, wherein the rubber latex is a butadiene-styrene latex, the stabilizer therefor is polyvinyl alcohol, the argillaceous material is bentonite clay and the oil-in-water asphalt emulsion is a quick-breaking asphalt emulsion meeting ASTM demulsibility specifications.

9. In the process of preparing an adhesive composition by intimately admixing a rubber latex, mineral filler to increase substantially the viscosity of said composition, and a bituminous emulsion, the improvement which comprises first mixing about 3 to 6 parts of the mineral filler in about 4 to 6 parts, based on the solids content, of a rubber latex containing about 1 to 3 parts of a stabilizing agent for the rubber latex to prevent breakdown of the rubber latex upon contact with the mineral filler, and then mixing the resulting rubber latex-mineral filler mixture with about 40 to 50 parts, based on the solids content, of an oil-in-water bituminous emulsion, sufficient water being present to effect a total of 100 parts of composition, the parts being by weight.

10. The improvement substantially as described in claim 9, wherein the mineral filler is argillaceous matter, the rubber latex is a butadiene-styrene latex, and the bituminous emulsion is an asphalt quick-breaking emulsion meeting ASTM demulsibility specifications.

11. The improvement substantially as described in claim 10, wherein the stabilizer for the butadiene-styrene latex is polyvinyl alcohol.

12. In the process of preparing an adhesive composition by intimately admixing a rubber latex, mineral filler to increase substantially the viscosity of said composition, and a bituminous emulsion, the improvement which comprises stabilizing about 4 to 6 parts, based on the solids content, of a rubber latex with about 1 to 3 parts of a stabilizing agent for said rubber latex to prevent breakdown of said rubber latex upon contact with mineral water, subsequently mixing with the stabilized rubber latex about 3 to 6 parts of a mineral filler, and then mixing the resulting mixture with about 40 to 50 parts, based on the solids content, of an oil-in-water bituminous emulsion, sufficient water being present to effect a total of 100 parts of composition, the parts being by weight.

13. The improvement substantially as described in claim 12, wherein the rubber latex is butadiene-styrene latex, the stabilizing agent for said rubber latex is polyvinyl alcohol, the mineral filler is argillaceous material, and the bituminous emulsion is an asphalt emulsion.

14. The improvement substantially as described in claim 13, wherein the argillaceous material is bentonite clay, and the asphalt emulsion is a quick-breaking asphalt emulsion meeting ASTM demulsibility specifications for quick-breaking asphalt emulsions.

WALTER D. BUCKLEY.
PAUL E. McCOY.
LYNDON G. THOMPSON.

REFERENCES CITED

The following references are of record in the file of this patent:

UNITED STATES PATENTS

| Number | Name | Date |
|---|---|---|
| 1,567,506 | Hopkinson | Dec. 29, 1925 |
| 1,689,581 | Day | Oct. 30, 1928 |
| 1,831,226 | Byrd | Nov. 10, 1931 |
| 2,148,128 | McIntyre | Feb. 21, 1939 |
| 2,237,753 | Dangelmayer et al. | Sept. 8, 1941 |
| 2,288,293 | Metcalf | June 30, 1942 |
| 2,368,949 | Smith | Feb. 6, 1945 |